US011436172B2

(12) United States Patent
Hantz et al.

(10) Patent No.: US 11,436,172 B2
(45) Date of Patent: Sep. 6, 2022

(54) DATA FRAME INTERFACE NETWORK DEVICE

(71) Applicant: Hughes Network Systems, LLC, Germantown, MD (US)

(72) Inventors: Dan Hantz, Germantown, MD (US); Nimesh Ambeskar, Germantown, MD (US); Yogesh Sethi, Germantown, MD (US); Vivek Gupta, Germantown, MD (US); Patrick O'Neil, Germantown, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 0 days.

(21) Appl. No.: 17/022,389

(22) Filed: Sep. 16, 2020

(65) Prior Publication Data

US 2022/0083485 A1 Mar. 17, 2022

(51) Int. Cl.
*G06F 13/28* (2006.01)
*G06F 13/32* (2006.01)
*H04L 49/90* (2022.01)
*H04L 69/22* (2022.01)

(52) U.S. Cl.
CPC ............... *G06F 13/28* (2013.01); *G06F 13/32* (2013.01); *H04L 49/90* (2013.01); *H04L 69/22* (2013.01)

(58) Field of Classification Search
CPC ...................................................... G06F 13/28
USPC ......................................................... 710/22
See application file for complete search history.

(56) References Cited

U.S. PATENT DOCUMENTS

| 5,655,140 | A  | * | 8/1997  | Haddock   | H04L 12/4625  |
|           |    |   |         |           | 709/246       |
| 5,809,334 | A  | * | 9/1998  | Galdun    | G06F 13/28    |
|           |    |   |         |           | 710/22        |
| 5,878,217 | A  | * | 3/1999  | Cherukuri | G06F 13/387   |
|           |    |   |         |           | 709/212       |
| 5,974,518 | A  | * | 10/1999 | Nogradi   | H04L 49/90    |
|           |    |   |         |           | 709/236       |
| 6,865,616 | B1 | * | 3/2005  | Adams     | H04B 7/18584  |
|           |    |   |         |           | 709/231       |
| 2001/0021949 | A1 | * | 9/2001  | Blightman | H04L 69/161   |
|           |    |   |         |           | 709/219       |
| 2001/0043575 | A1 | * | 11/2001 | Kelly     | H04B 7/18578  |
|           |    |   |         |           | 370/321       |
| 2004/0131073 | A1 | * | 7/2004  | Hahn      | H04L 41/0213  |
|           |    |   |         |           | 370/422       |
| 2009/0002227 | A1 | * | 1/2009  | Jia       | G01S 19/37    |
|           |    |   |         |           | 342/357.27    |

(Continued)

*Primary Examiner* — Titus Wong
(74) *Attorney, Agent, or Firm* — Bejin Bieneman PLC

(57) ABSTRACT

Disclosed herein is a system including a network interface arranged to receive a data frame from one or more communication networks. A frame filter is arranged to receive the data frame from the network interface, wherein the frame filter selectively outputs the data frame to at least one of a second network interface or a direct memory access (DMA) controller based on a data frame type. The DMA controller is arranged to store a received data frame to shared memory and transmit an interrupt signal to a media access control (MAC) driver after the received data frame is stored in the shared memory so that the MAC driver can initiate an interrupt handler in response to the interrupt signal to retrieve the stored data frame.

18 Claims, 5 Drawing Sheets

(56) References Cited

U.S. PATENT DOCUMENTS

2014/0254594 A1* 9/2014 Gasparakis ........... H04L 69/324
370/392

* cited by examiner

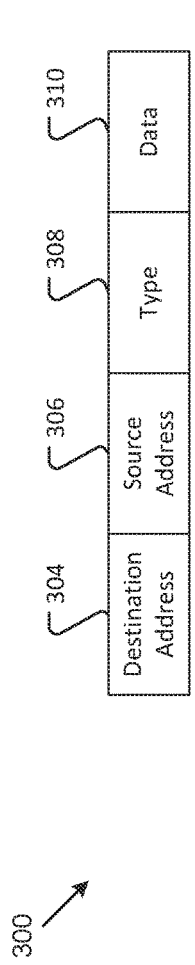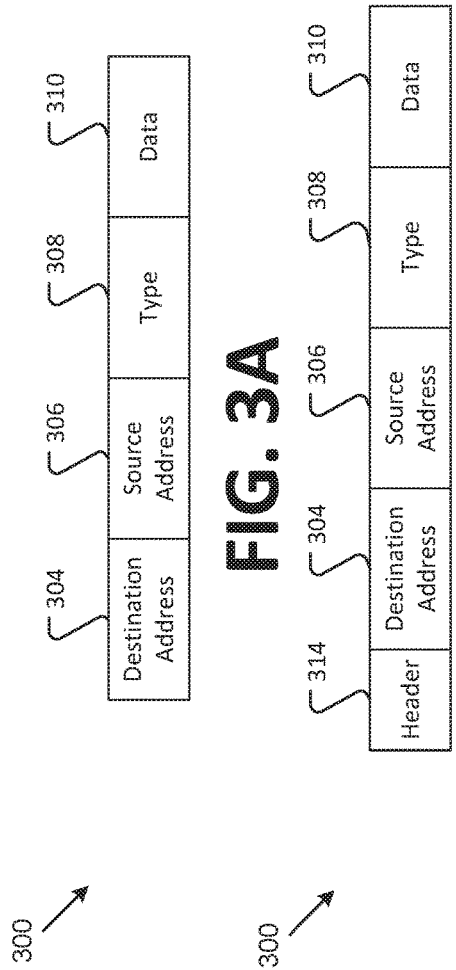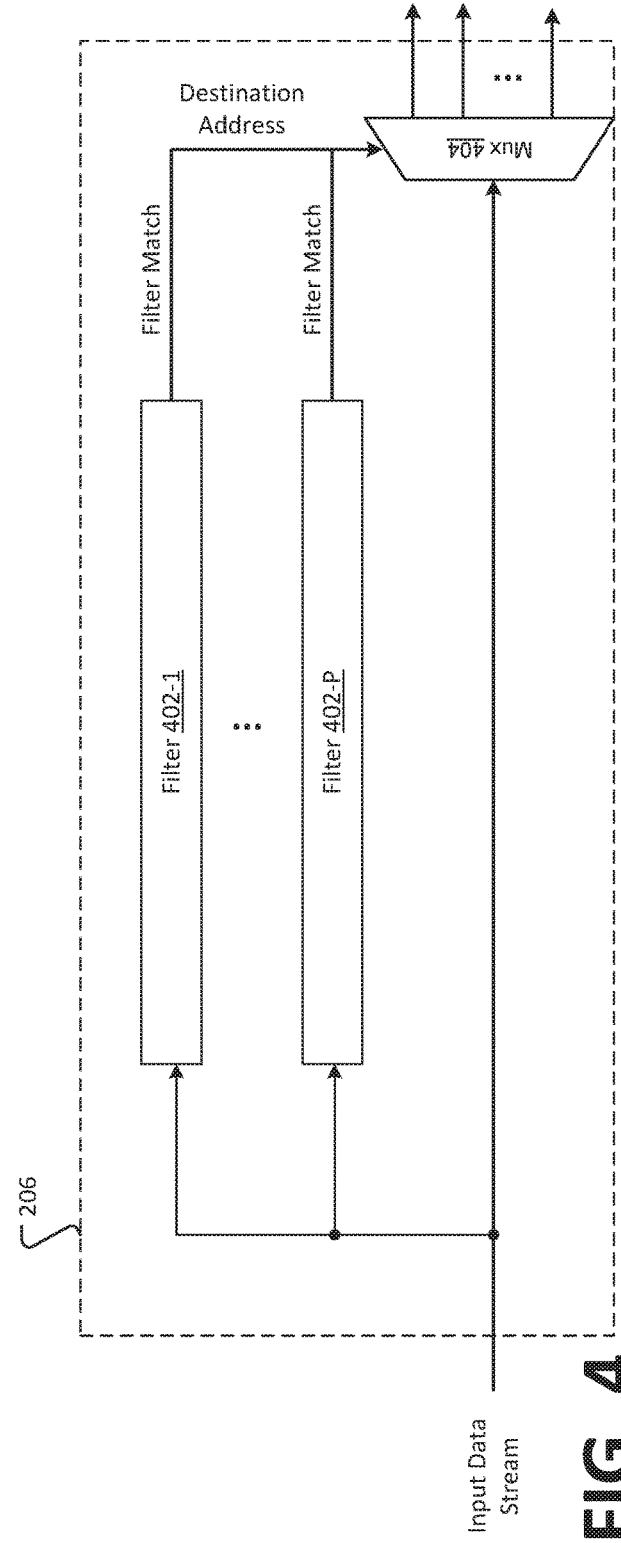

DATA FRAME INTERFACE NETWORK DEVICE

BACKGROUND

A satellite network allows traffic between devices, terminals, satellite(s), and gateways. For example, a device such as a mobile device or computer, connected through a local area network to a terminal, can communicate with another device, i.e., via a satellite uplink and/or downlink and one or more gateways.

BRIEF DESCRIPTION OF THE DRAWINGS

FIGS. 3A and 3B are diagrammatic illustrations of data frames transmitted within the network interface of FIG. 2.

FIG. 4 is a block diagram of an example frame filter within the gateway of FIG. 2.

DETAILED DESCRIPTION

Figure 1:
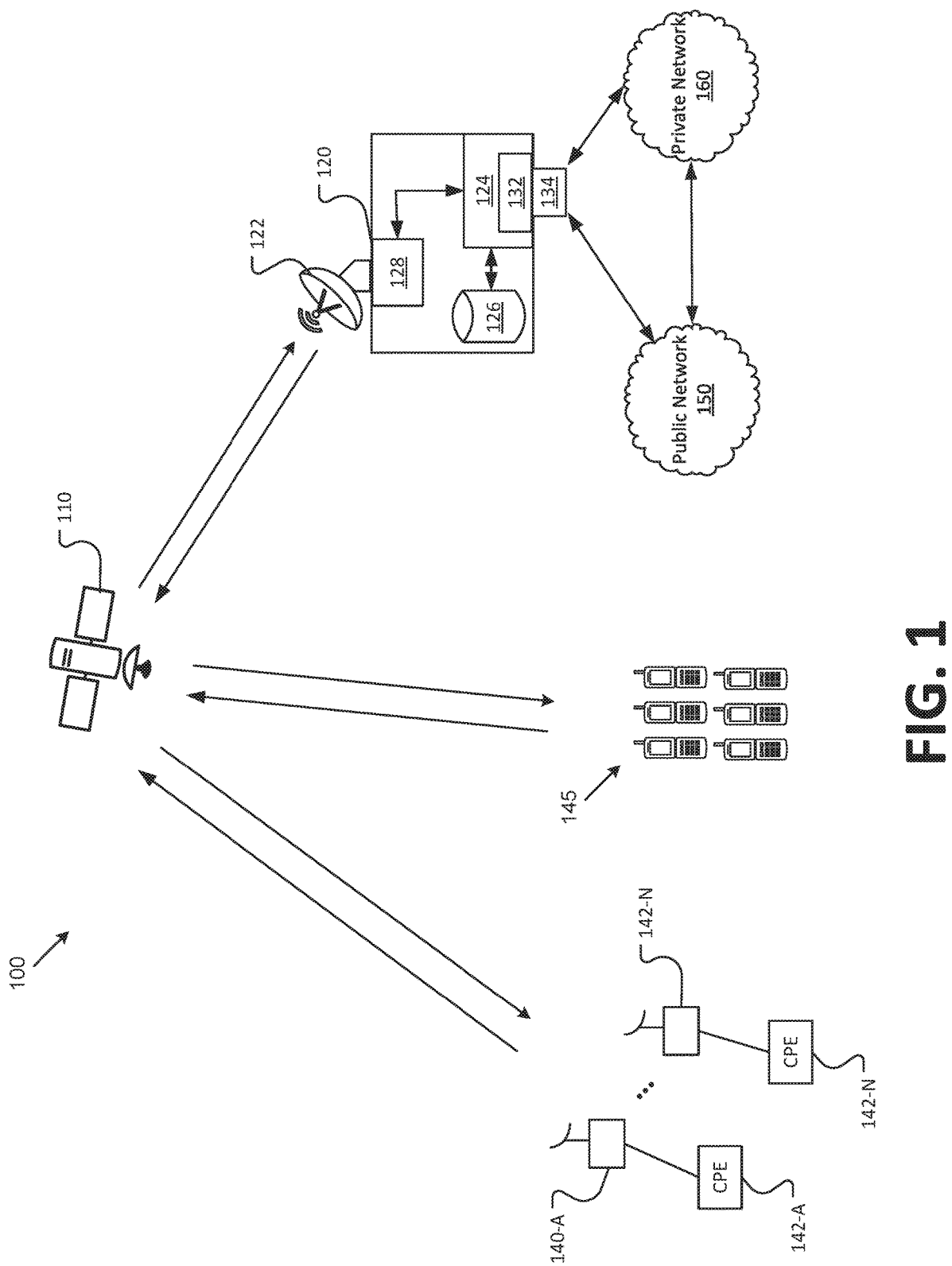
FIG. 1 illustrates an example satellite telecommunications network.

Disclosed herein is a system including a network interface arranged to receive a data frame from one or more communication networks. A frame filter is arranged to receive the data frame from the network interface, wherein the frame filter selectively outputs the data frame to at least one of a second network interface or a direct memory access (DMA) controller based on a data frame type. The DMA controller is arranged to store a received data frame to shared memory and transmit an interrupt signal to a media access control (MAC) driver after the received data frame is stored in the shared memory so that the MAC driver can initiate an interrupt handler in response to the interrupt signal to retrieve the stored data frame.

In other features, the system includes the MAC driver arranged to retrieve the stored data frame after receiving the interrupt signal and provides the stored data frame to a kernel network stack.

In other features, the data frame type comprises at least one of a high-speed data frame, a protocol frame, or a management frame, wherein the high-speed data frame comprises a data frame transmitted up to a rate of at least one hundred gigabits per second (Gbit/s).

In other features, the frame filter is arranged to selectively output the data frame to the second network interface when the data frame type of the data frame is a high-speed data frame and to the DMA controller when the data frame type is at least one of a protocol frame or a management frame.

In other features, the frame filter comprises a plurality of comparators and an inverse multiplexer.

In other features, each comparator of the plurality of comparators includes an input and an output, wherein each input receives the data frame and compares one or more bits of the data frame to at least one configurable filter value and configurable filter mask.

In other features, wherein the network interface receives the data frame from a terrestrial connection point.

In other features, the second network interface comprises a radio frequency transceiver (RFT) interface that receives data frames from a satellite.

In other features, the DMA controller inserts a header portion into the data frame, wherein the header portion comprises data indicative of a length to a next header field.

Further disclosed herein is a satellite communication system and a gateway that communicates with the satellite and surface-based communication networks. The gateway includes a network interface arranged to receive a data frame from one or more communication networks and a frame filter arranged to receive the data frame from the network interface. The frame filter selectively outputs the data frame to at least one of a second network interface or a direct memory access (DMA) controller based on a data frame type. The gateway also includes the DMA controller that is arranged to store a received data frame to shared memory and transmit an interrupt signal to a media access control (MAC) driver after the received data frame is stored in the shared memory so that the MAC driver can initiate an interrupt handler in response to the interrupt signal to retrieve the stored data frame In other features, the gateway includes the MAC driver arranged to retrieve the stored data frame after receiving the interrupt signal and provides the stored data frame to a kernel network stack.

In other features, the data frame type comprises at least one of a high-speed data frame, a protocol frame, or a management frame, wherein the high-speed data frame comprises a data frame transmitted up to a rate of at least one hundred gigabits per second (Gbit/s).

In other features, the frame filter is arranged to selectively output the data frame to the second network interface when the data frame type of the data frame is a high-speed data frame and to the DMA controller when the data frame type is at least one of a protocol frame or a management frame.

In other features, the frame filter comprises a plurality of comparators and an inverse multiplexer.

In other features, each comparator of the plurality of comparators includes an input and an output, wherein each input receives the data frame and compares one or more bits of the data frame to at least one configurable filter value and configurable filter mask.

In other features, wherein the network interface receives the data frame from a terrestrial connection point.

In other features, the second network interface comprises a radio frequency transceiver (RFT) interface that receives data frames from the satellite.

Further disclosed herein is a method that includes receiving, at a network interface, a data frame from one or more communication networks and selectively outputting, via a frame filter, the data frame at least one of a second network interface or a direct memory access (DMA) controller based on a data frame type. The method also includes storing, via the DMA controller, a received data frame to shared memory and transmitting an interrupt signal to a media access control (MAC) driver after the received data frame is stored in the shared memory so that the MAC driver can initiate an interrupt handler in response to the interrupt signal to retrieve the stored data frame.

In other features, the method includes retrieving, via the MAC driver, the stored data frame after receiving the interrupt signal and provides the stored data frame to a kernel network stack.

In other features, the data frame type comprises at least one of a high-speed data frame, a protocol frame, or a management frame, wherein the high-speed data frame comprises a data frame transmitted up to a rate of at least one hundred gigabits per second (Gbit/s).

In embedded systems, handling the high throughput of a data frame, such as data link layer protocol data unit, transmitted from one hundred gigabit (100G) Ethernet interfaces can become infeasible for software to handle. In these instances, the embedded systems may require high-end processors, e.g., controllers, or specialized networking processors to process the data frames.

A gateway can include a frame filter such that high-speed data frames can be handled by a programmable logic portion of the embedded system and non-high-speed data frames can be handled by the processor system portion of the embedded system. For example, the programmable logic portion can cause the high-speed data frames to be stored in the memory, such as a dynamic random access (DRAM) portion of the memory, for network processing. As such, a controller within a processor system portion of the embedded system may be utilized for application centric processing. In an example implementation, the programmable logic portion of the embedded system may comprise a field-programmable gate array (FPGA) fabric.

FIG. 1 illustrates a satellite communication system 100 capable of providing voice and data services. The satellite communication system 100 includes a satellite 110 that supports communications among one or, typically, more gateways 120 (only one shown) and multiple stationary satellite terminals 140-A through 140-N, where A and N are integers greater than or equal to one. Each stationary satellite terminal (or terminal) 140 can be configured for relaying traffic between its customer premise equipment (CPEs) 142-A through 142-N, and one or more surface-based communication networks, e.g., a public network 150 such as the internet, and/or a private network 160. According to an exemplary implementation, the terminals 140 can be in the form of very small aperture terminals (VSATs) that are mounted on a structure, habitat, etc. According various implementations, the terminals 140 can be mounted on mobile platforms that facilitate transportation thereof from one location to another. Such mobile platforms can include, for example, cars, buses, boats, planes, etc. The terminals 140 can further be in the form of transportable terminals capable of being transported from one location to another. Such transportable terminals are operational only after arriving at a particular destination, and not while being transported.

As illustrated in FIG. 1, the satellite communication system 100 can also include a plurality of mobile terminals 145 that are capable of being transported to different locations by a user. In contrast to transportable terminals, the mobile terminals 145 remain operational while users travel from one location to another. The gateway 120 can be configured to route traffic from stationary, transportable, and mobile terminals (collectively terminals 140) across the public network 150 and private network 160 as appropriate. The gateway 120 can be further configured to route traffic from the public internet 150 and private network 160 across the satellite link to the appropriate terminal 140. The terminal 140 then routes the traffic to the appropriate customer premise equipment (CPE) 142.

According to at least one implementation, the gateway 120 can include various components, implemented in hardware, software, or a combination thereof, to facilitate communication between the terminals 140 and external network 150, 160 via the satellite 110. According to an implementation, the gateway 120 components can include a radio frequency transceiver 122 (RFT), a programmable integrated circuit 124, and a data storage device 126 (or storage device). As used herein, a transceiver is any type of antenna device used to transmit and receive signals, a transmitter, a receiver, etc. The RFT 122 can transmit and receive signals within a communication system such, as the satellite communication system 100 illustrated in FIG. 1. The data storage device 126 can be used, for example, to store and provide access to information pertaining to various operations in the satellite communication system 100. According to other implementations, the gateway 120 can include multiple programmable integrated circuits 124 and multiple data storage devices 126. The data storage device 126 can be, for example, a single drive, multiple drives, an array of drives configured to operate as a single drive, etc. Various implementations further provide for redundant paths for components of the gateway 120. The redundant paths can be associated with backup components capable of being seamlessly or quickly switched in the event of a failure or critical fault of the primary component.

In various implementations, the data storage device 126 may be referred to as memory 126. The memory 126 may include any non-transitory computer usable or readable medium, which may include one or more storage devices or storage articles. The memory 126, as explained in greater detail below, can comprise shared memory 126 accessible by multiple systems. Exemplary non-transitory computer usable storage devices include conventional hard disk, solid-state memory, random access memory (RAM), read-only memory (ROM), erasable programmable read-only memory (EPROM), electrically erasable programmable read-only memory (EEPROM), as well as any other volatile or non-volatile media. Non-volatile media include, for example, optical or magnetic disks and other persistent memory, and volatile media, for example, also may include dynamic random-access memory (DRAM). These storage devices are non-limiting examples; e.g., other forms of computer-readable media exist and include magnetic media, compact disc ROM (CD-ROMs), digital video disc (DVDs), other optical media, any suitable memory chip or cartridge, or any other medium from which a computer can read.

According to the illustrated implementation, the gateway 120 includes baseband components 128 that process signals being transmitted to, and received from, the satellite 110. For example, the baseband components 128 can incorporate one or more modulator/demodulator devices, system timing equipment, switching devices, etc. The modulator/demodulator devices can be used to generate carriers that are transmitted into each spot beam and to process signals received from the terminals 140. The system timing equipment can be used to distribute timing information for synchronizing transmissions from the terminals 140.

The gateway 120 can further include a network interface 132 for establishing connections with a terrestrial connection point 134 from a service provider. Depending on the specific implementation, however, multiple terrestrial connection points 134 may be utilized. The terrestrial connection point 134 provides a connection to a communication network, such as the public network 150 and/or the private network 160. A communication network 150, for example, may be a local area network (LAN) configured in accordance with IEEE 802.3, e.g., Ethernet. The communication network 150 typically provides communication access to a public network 160, e.g., including the Internet. The network interface 132 may be connected to the terrestrial connection point 134 via a wired connection or a wireless connection. In some instances, the terrestrial connection point 134 may connect the network interface 132 to networking hardware, such as a network switch.

Figure 2:
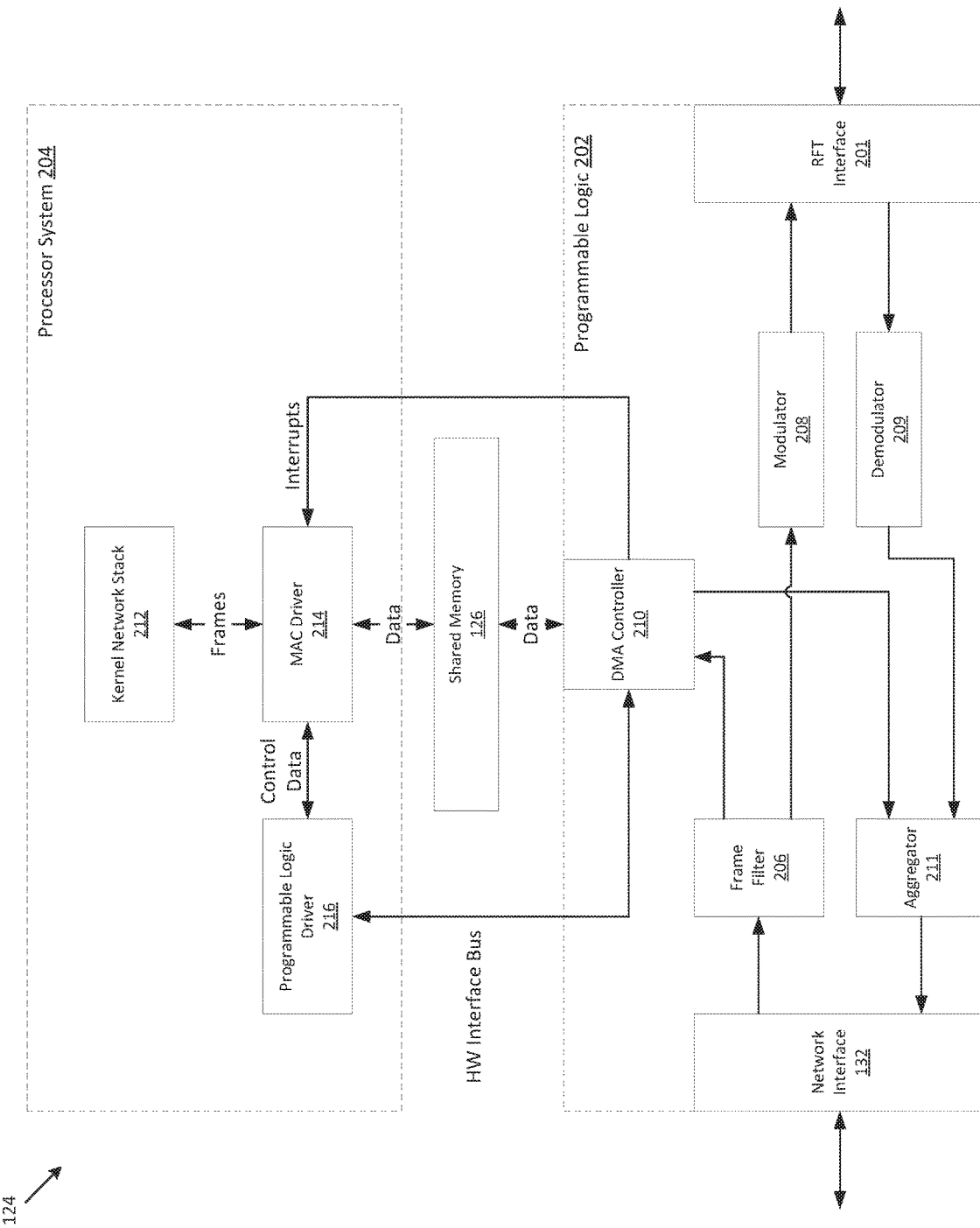
FIG. 2 is block diagram of an example network interface within the satellite telecommunications network of FIG. 1.

FIG. 2 illustrates an example of the programmable integrated circuit 124 on which the disclosed circuits and processes may be implemented. In one or more implementations, the programmable integrated circuit 124 can be used within the gateway 120 for the purposes of directing data packets to various portions of the programmable integrated circuit 124.

As shown, the programmable integrated circuit 124 includes programmable logic 202 and a processor operating system 204. It is understood that only a portion of the programmable logic 202 and the processor system 204 is illustrated as described herein. The programmable logic 202 and the processor system 204 may comprise a field-programmable gate array (FPGA), which may comprise an array of programmable logic blocks. The programmable logic 202 can comprise circuitry that implements the logic of a specific design using programmable components that may include, for example, function generators, registers, arithmetic logic, and so forth. The processor system 204 can comprise circuitry, including one or more controllers and/or drivers, that can execute program code.

As just mentioned and as discussed further herein, the programmable logic 202 is circuitry that may be programmed to perform specified functions. As an example, the programmable logic 202 may be implemented as field programmable gate array (FPGA) circuitry. The programmable logic 202 may include an array of programmable circuit blocks. Examples of programmable circuit blocks within the programmable logic 202 include, but are not limited to, configurable logic blocks (CLBs), dedicated random access memory blocks (BRAM), digital signal processing blocks (DSPs), clock managers, and/or delay lock loops (DLLs).

The processor system 204 can be implemented as hard-wired circuitry that is fabricated as part of programmable integrated circuit 124. The processor system 204 may be implemented as, or include, any of a variety of different processor, e.g., controller, types. For example, the processor system 204 may be implemented as an individual processor, e.g., a single core capable of executing program code. In another example, the processor system 204 may be implemented as a multi-core processor. In still another example, the processor system 204 may include one or more cores, modules, co-processors, interfaces, and/or other resources. The processor system 204 may be implemented using any of a variety of different types of architectures. Example architectures that may be used to implement the processor system 204 may include, but are not limited to, an ARM processor architecture, an x86 processor architecture, RISC architectures, a GPU architecture, a mobile processor architecture, a DSP architecture, or other suitable architecture that is capable of executing computer-readable instructions or program code. In some embodiments, the processor system 204 may have both low power domains (LPDs) and full power domains (FPDs).

The programmable integrated circuit 124 receives and/or transmits data via the network interface 132 from and/or to the terrestrial connection point 134. The programmable integrated circuit 124 also receives and/or transmits data via an RFT interface 201 from and/or to the RFT 122. The interfaces 132, 201 may be referred to as communication network interfaces and provide for the programmable integrated circuit 124 to communicate with the terrestrial connection point 134 and/or the RFT 122 via the baseband components 128, respectively. The processor system 204 may include an operating system (OS), which is executable by a controller 205. A portion of the operating system, known as the kernel, may comprise protocol stacks for translating commands and data between the applications and a device driver specific to the network interface devices. The protocol stacks may be implemented using Transmission Control Protocol/Internet Protocol (TCP/IP). The protocol stacks may support address resolution protocols (ARPs), Internet Control Message Protocol version 6 (ICMPv6), and/or IPv6 stateless autoconfiguration. As used herein, a driver may refer to executable computer programs that operate or control a particular device The programmable logic 202 can include a frame filter 206, a modulator 208, and a direct memory access (DMA) controller 210. The frame filter 206, which is described in greater detail below with respect to FIG. 4, receives one or more data frames from the network interface 132. As described herein, the frame filter 206 filters the data frames based on a data frame type. The data frame types may include high-speed data frames, protocol frames, and management frames. Within the present disclosure, high-speed data frames may refer to data frames transmitted up to rates of one hundred (100) gigabits per second (Gbit/s). Based on the data frame type, the frame filter 206 can filter the data frame to another network interface or the DMA controller 210. In an example implementation, high-speed data frames can be filtered to the modulator 208 to modulate the data frame for radio frequency transmission. The modulator 208 can provide the modulated data frame to the RFT interface 201.

For example, high-speed data frames can be diverted such that the high-speed data frames are provided to the modulator 208 and non-high-speed data frames, e.g., protocol frames, management frames, are written to the shared memory. As discussed herein, non-high-speed data frames may be provided to a kernel network stack 212 of the processor system 204 for processing. In an example implementation, a data frame is a specified unit of data and may comprise an Ethernet frame, e.g., a data link layer protocol data unit.

The frame filter 206 can filter high-speed data frames such that the high-speed data frames are provided to the modulator 208. The modulator 208 modulates the high-speed data frame and provides the modulated high-speed data frame to the RFT interface 201. The non-high-speed data frames can be filtered to the DMA controller 210 such that the filtered non-high-speed data frames can be written to the shared memory 126 without waiting for the processor system 204 to request the non-high-speed data frames.

As described in greater detail below, once the filtered data frames are provided to the shared memory 126, the DMA controller 210 generates and transmits an interrupt signal to a media access control (MAC) driver 214 of the processor system 204. The interrupt signal can cause the MAC driver 214 to temporarily stop executing a program such that the MAC driver 214 can allow an interrupt handler to execute. For instance, the interrupt handler can execute an appropriate interrupt service routine to handle the interrupt signal.

The DMA controller 210 can include preloaded memory addresses such that data included in the filtered data frames is written to the shared memory 126 according to the preloaded memory addresses. The preloaded memory addresses represent memory addresses corresponding to allocated memory space within the shared memory 126 for storing filtered data. The DMA controller 210 can include a pointer that references a memory location within the shared memory 126. For example, once data has been written to the shared memory 126, the pointer can be updated with the next memory location within the preloaded memory addresses.

The programmable logic 202 can also include a demodulator 209 and an aggregator 211. The programmable logic 202 can receive data from the RFT 122 via the RFT interface 201. The demodulator 209 demodulates the received data such that the demodulated data can be transmitted via a communication network. The demodulated data is provided to the aggregator 211, and the aggregator 211 can aggregate multiple data streams of data units into a single data stream for transmission. The aggregated data is then provided to the network interface 132 for transmission.

As shown in FIG. 2, the processor system 204 can include the kernel network stack 212, the MAC driver 214, and a programmable logic driver 216. After receiving the interrupt signal, the MAC driver 214 can access the shared memory 126 to retrieve the data of the filtered data frames. The MAC driver 214 can receive memory address data from the programmable logic driver 216. The memory address data can be provided to the programmable logic driver 216 via the DMA controller 210. The memory address data can represent the location of the data that was written to the shared memory 126 by the DMA controller 210. Using the memory address data, the MAC driver 214 accesses the stored data and provides the accessed data to the kernel network stack 212 for processing.

FIG. 3A illustrates an example filtered data frame 300. As shown, the data frame 300 includes a destination address portion 304, a source address portion 306, a type portion 308, and a data portion 310. After the DMA controller 210 receives the data frame 300 from the frame filter 206, the DMA controller 210 determines a memory address to write the data frame 300 to within the shared memory 126. As shown in FIG. 3B, the DMA controller 210 modifies the data frame 300 by inserting a header portion 314. In an example implementation, the header portion 314 is inserted before the destination address portion 304. The header portion 314 can provide data specifying a length to a next header field and can be used by the MAC driver 214 in the event the MAC driver 214 cannot handle an interrupt prior to a next interrupt signal being generated. For example, the header portion 314 can include data representing a location of the next memory address that will store the next filtered data frame.

FIG. 4 illustrates an example frame filter 206 according to an example implementation. As shown, the frame filter 206 can include filters 402-1 through 402-P, where P is an integer greater than or equal to one. In an example implementation, the filters 402-1 through 402-P may comprise 512-bit comparators. The comparators are configurable such that the comparators can compare specific bits of the received data frames within the 512-bit range. Based on the comparison of the comparator, the filters 402-1 through 402-P output filter matches to an inverse multiplexer 404. The comparators can determine a data frame type based on the comparison of the respective bits with the filters. The filter matches can be concatenated to form an address provided to the inverse multiplexer 404. As shown, the multiplexer 404 may comprise an inverse multiplexer. The input data frame is then forwarded to either the modulator 208 if the input data frame is a high-speed data frame or to the DMA controller 210 is a non-high-speed data frame.

The comparators can implement Boolean logic to compare the bits of the data frame to configurable filter values and configurable filter masks. The filter values and filter masks may be set based on the specific implementation of the filter frame 206 such that a data frame is diverted to the desired destination. For instance, each bit of the data frame may be compared to a filter value and a filter mask to generate a bit match value. The filter match output by the comparators 402-1 through 402-P may be a logical AND output of the bit match values and the bits of the data frame.

Figures 5, 6:
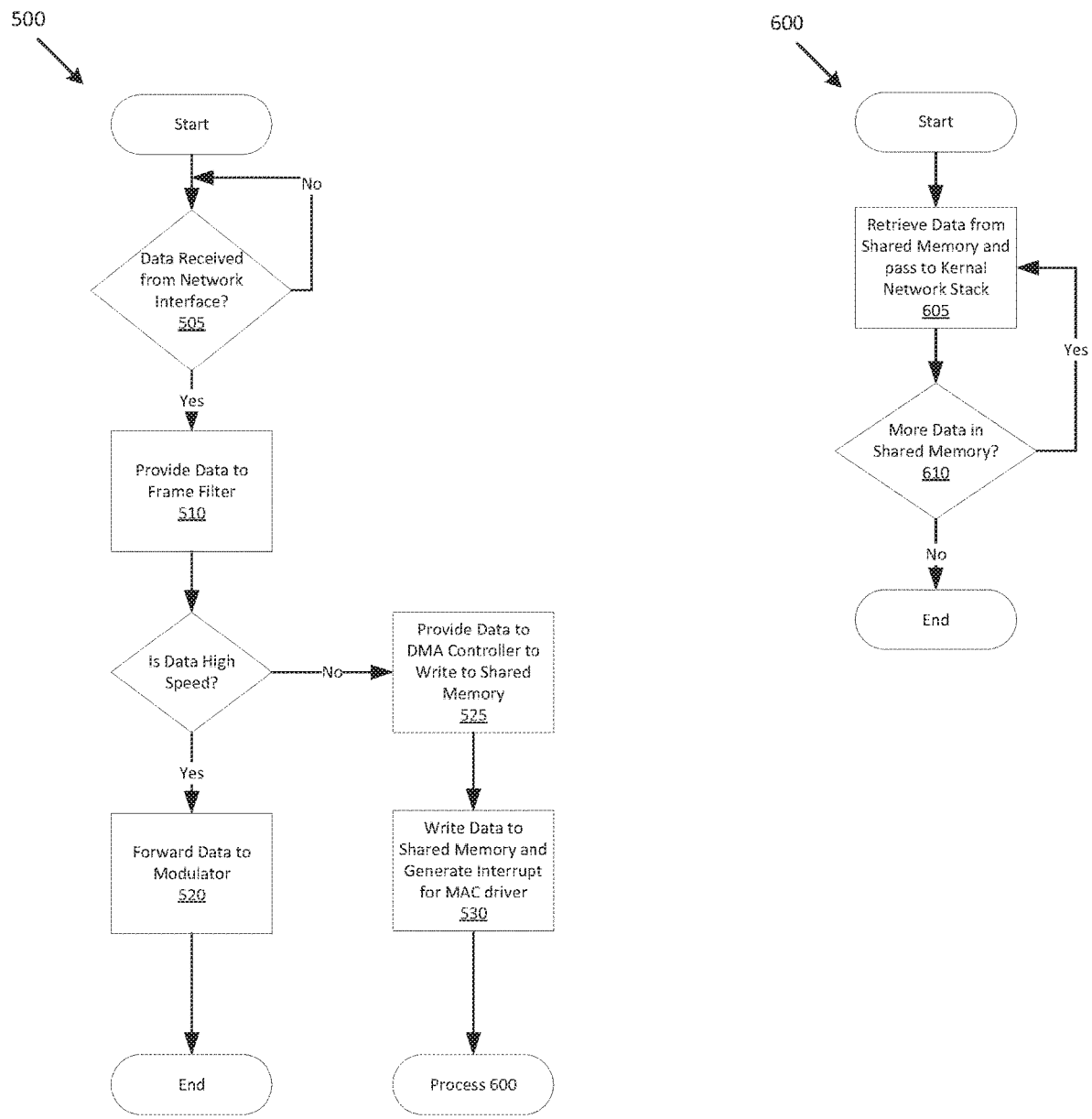
FIG. 5 is a flowchart of an example process to selectively filter a data frame based on a data frame type.
FIG. 6 is a flowchart of an example process for processing a selectively filtered data frame stored in a shared memory.

FIG. 5 illustrates an example process 500 for filtering a data frame, such as a data frame received from the network interface 132. Blocks of the process 500 can be executed by one or more of the components of the gateway 120. For example, the blocks of the process 500 can be executed by one or more components of the programmable logic 202.

The process 500 begins at block 505 in which a determination is made whether data has been received at the network interface 132. As described above, the data comprises a data link layer protocol data unit. If no data has been received, the process 500 returns to block 505. If data has been received, the data is provided to the frame filter 206 at block 510. At block 515, a determination is made of whether the data is a high-speed data frame at the frame filter 206. If the data is a high-speed data frame, the data is forwarded to the modulator 208 at block 520, and the process 500 ends.

If the data is not a high-speed data frame, the data is transmitted to the DMA controller 210 at block 525. As discussed above, the DMA controller 210 receives data from the frame filter 206 and includes the header portion 214 for writing the data to the shared memory 126. At block 530, the DMA controller 210 writes the data to the shared memory 126 and generates an interrupt signal that is sent to the MAC driver 214, and the process 500 transitions to process 600 described below. The DMA controller 210 can write the shared memory 126 based on preloaded memory addresses that represent memory addresses corresponding to allocated memory space in the shared memory 126.

FIG. 6 illustrates an example process 600 for processing a data frame. Blocks of the process 600 can be executed by one or more of the components of the gateway 120. For example, the blocks of the process 600 can be executed by one or more components of the processor system 204.

The process 600 begins at block 605 in which the MAC driver 214 retrieves the data from the shared memory 126 and provides the data to the kernel network stack 212 for processing. The MAC driver 214 can retrieve the data from the shared memory 126 after receiving the interrupt signal. For example, the MAC driver 214 can initiate an interrupt handler in response to the interrupt signal such that current processes are suspended, and the MAC driver 214 can retrieve the stored data frame. The MAC driver 214 can initially access the data based on data received from the programmable logic driver 216. For instance, the programmable logic driver 216 can receive the memory address of the stored data from the DMA controller 210.

At block 610, a determination is made whether additional data has been written to the shared memory 126. If there is additional data stored, the process 600 returns to block 605. The MAC driver 214 can determine there is additional data based on the receipt of additional interrupt signals and/or control signals provided by the programmable logic driver 216. The MAC driver 214 may use the header portion 314 to determine the memory location of the next data frame stored in the shared memory 126. If there is no additional data stored, the process 600 ends after block 610.

Figure 7:
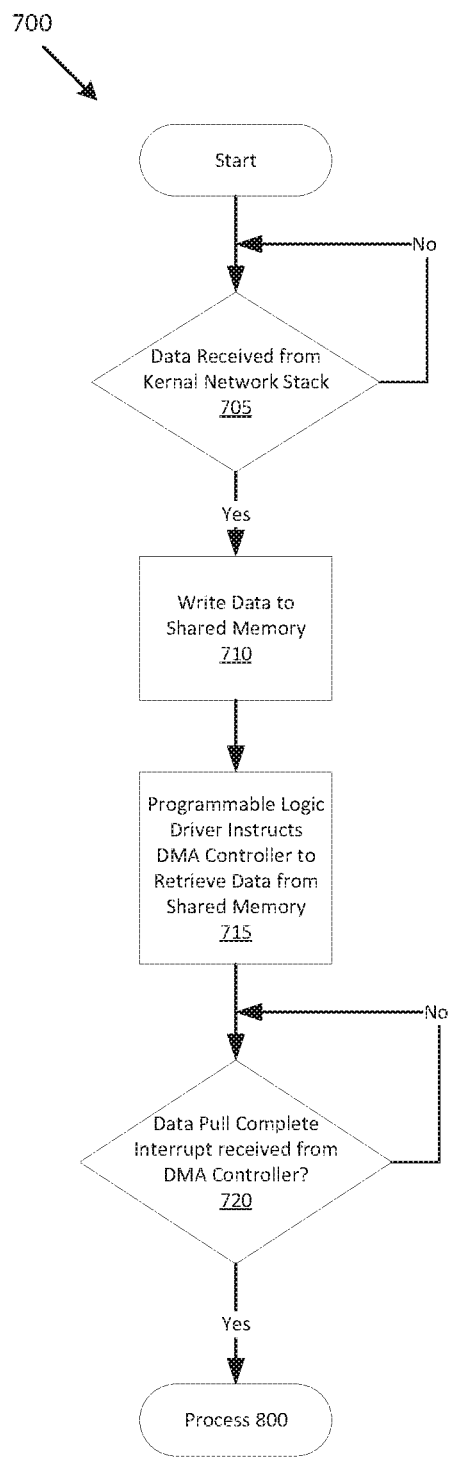
FIG. 7 is a flowchart of an example process for processing a data frame received from a network stack.

FIG. 7 illustrates an example process 700 for processing a data frame from a network stack, such as the kernel network stack 212. Blocks of the process 700 can be executed by one or more of the components of the gateway 120. For example, the blocks of the process 700 can be executed by one or more components of the processor system 204.

The process 700 begins at block 705 in which a determination is made whether data, e.g., a data frame, has been received from the kernel network stack 212. Once the kernel network stack 212 has processed a received data frame, the kernel network stack 212 can provide a data frame to the MAC driver 214 in response to the processed data frame. The MAC driver 214 can monitor whether data has been received from the kernel network stack 212. If no data has been received, the process 700 returns to block 705. If data has been received from the kernel network stack 212, the MAC driver 214 writes the data to the shared memory 126 at block 710.

At block 715, the programmable logic driver 216 instructs the DMA controller 210 to retrieve data from the shared memory 126. Once the MAC driver 214 writes the data to the shared memory 126, the MAC driver 214 sends a signal to the programmable logic driver 216 indicating data can be retrieved. The signal can include a memory location within the shared memory 126 of where the data was written. In response to receiving the signal, the programmable logic driver 216 sends an instruction to the DMA controller 210 to retrieve data from the shared memory 126 at the memory location. At block 720, a determination is made whether a data retrieve completion interrupt has been received from the DMA controller 210. Once the MAC driver 214 sends the signal to the programmable logic driver, the MAC driver 214 can enter a monitoring state. For example, the MAC driver 214 can monitor whether the DMA controller 210 has generated and sent a data pull complete interrupt signal. The DMA controller 210 can generate the data pull complete interrupt signal once the DMA controller 210 has completed retrieving the data from the shared memory 126. If the data pull complete interrupt signal has not been received, the process 700 returns to block 725. Otherwise, the process 700 transitions to process 800 described below.

Figure 8:
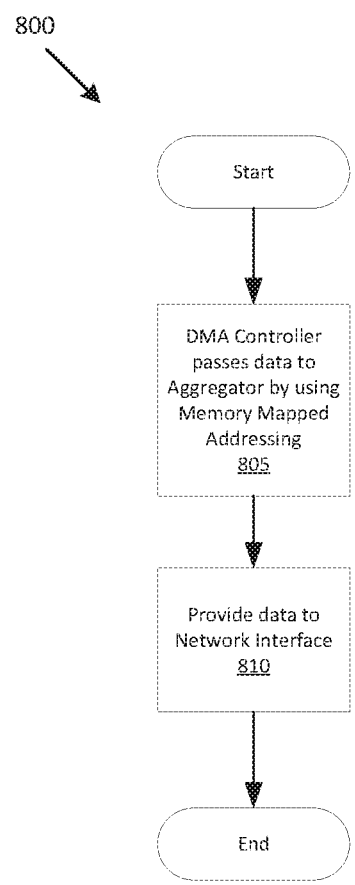
FIG. 8 is a flowchart of an example process for providing retrieved data frames to a network interface.

FIG. 8 illustrates an example process 800 for providing retrieved data frames to the network interface 132. Blocks of the process 800 can be executed by one or more of the components of the gateway 120. For example, the blocks of the process 800 can be executed by one or more components of the programmable logic 202.

The process 800 begins at block 805 in which the DMA controller 210 sends the retrieved data to the aggregator 211 using memory mapped addressing. Memory mapped addressing uses the same address space to address both the shared memory 126 and input/output (I/O) devices, e.g., network interface 132. At block 810, the data is provided to the network interface 132 by the aggregator 211. The aggregator 211 can aggregate multiple data units received from the DMA controller 210 prior to providing aggregated data to the network interface 132. The process 800 ends after block 810.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a satellite user terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain implementations and should in no way be construed so as to limit the claims.

Accordingly, it is to be understood that the above description is intended to be illustrative and not restrictive. Many implementations and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future implementations. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus, the following claims are hereby incorporated into the Detailed Description, with each claim standing on its own as a separately claimed subject matter.

What is claimed is:

1. A system comprising:
a network interface arranged to receive a data frame from one or more communication networks;
a modulator;
a direct memory access (DMA) controller; and
a frame filter arranged to receive the data frame from the network interface, wherein the frame filter determines a data frame type as one of a high-speed data frame, a protocol frame, or a management frame, and:
outputs the data frame to the modulator when the data frame type is determined to be the high-speed data frame; and
outputs the data frame to the DMA controller when the data frame type is determined to be the protocol frame or the management frame, wherein the DMA controller is arranged to store the data frame to shared memory and transmit an interrupt signal to a media access control (MAC) driver after the data frame is stored in the shared memory so that the MAC driver initiates an interrupt handler in response to the interrupt signal to retrieve the stored data frame.

2. The system of claim 1, further comprising the MAC driver arranged to retrieve the stored data frame after receiving the interrupt signal and provides the stored data frame to a kernel network stack.

3. The system of claim 1, wherein the high-speed data frame comprises a data frame transmitted using a one hundred gigabits per second (Gbit/s) protocol.

4. The system of claim 1, wherein the frame filter comprises a plurality of comparators and an inverse multiplexer.

5. The system of claim 4, wherein each comparator of the plurality of comparators includes an input and an output, wherein each input receives the data frame and compares one or more bits of the data frame to at least one configurable filter value and configurable filter mask.

6. The system of claim 1, wherein the network interface receives the data frame from a terrestrial connection point.

7. The system of claim 1, wherein the modulator provides the data frame as a modulated data frame to a radio frequency transceiver (RFT) interface that receives data frames from a satellite.

8. The system of claim 1, wherein the DMA controller inserts a header portion into the data frame, wherein the header portion comprises data indicative of a length to a next header field.

9. A satellite communication system comprising:
a satellite; and
a gateway that communicates with the satellite, the gateway comprising:
a network interface arranged to receive a data frame from one or more communication networks;
a modulator;
a direct memory access (DMA) controller; and
a frame filter arranged to receive the data frame from the network interface, wherein the frame filter determines a data frame type as one of a high-speed data frame, a protocol frame, or a management frame, and:
outputs the data frame to the modulator when the data frame type is determined to be the high-speed data frame; and
outputs the data frame to the DMA controller when the data frame type is determined to be the protocol frame or the management frame, wherein the DMA controller is arranged to store the data frame to shared memory and transmit an interrupt signal to media access control (MAC) driver after the data frame is stored in the shared memory so that the MAC driver initiates an interrupt handler in response to the interrupt signal to retrieve the stored data frame.

10. The satellite communication system of claim 9, the gateway further comprising the MAC driver arranged to retrieve the stored data frame after receiving the interrupt signal and provides the stored data frame to a kernel network stack.

11. The satellite communication system of claim 9, wherein the high-speed data frame comprises a data frame transmitted using a one hundred gigabits per second (Gbit/s) protocol.

12. The satellite communication system of claim 9, wherein the frame filter comprises a plurality of comparators and an inverse multiplexer.

13. The satellite communication system of claim 12, wherein each comparator of the plurality of comparators includes an input and an output, wherein each input receives the data frame and compares one or more bits of the data frame to at least one configurable filter value and configurable filter mask.

14. The satellite communication system of claim 9, wherein the network interface receives the data frame from a terrestrial connection point.

15. The satellite communication system of claim 9, wherein the modulator provides the data frame as a modulated data frame to a radio frequency transceiver (RFT) interface.

16. A method comprising:
receiving, at a network interface, a data frame from one or more communication networks;
determining, via a frame filter, a data frame type as one of a high-speed data frame, a protocol frame, or a management frame, and:
outputting, via the frame filter, the data frame to a modulator upon determining the data frame type is the high-speed data frame;
outputting, via the frame filter, the data frame to a direct memory access (DMA) controller upon determining the data frame type is the protocol frame or the management frame; and
upon outputting the data frame to the DMA controller, storing, via the DMA controller, the data frame to shared memory and transmitting an interrupt signal to a media access control (MAC) driver after the data frame is stored in the shared memory so that the MAC driver initiates an interrupt handler in response to the interrupt signal to retrieve the stored data frame.

17. The method of claim 16, further comprising retrieving, via the MAC driver, the stored data frame after receiving the interrupt signal and providing the stored data frame to a kernel network stack.

18. The method of claim 16, wherein the high-speed data frame comprises a data frame transmitted using a one hundred gigabits per second (Gbit/s) protocol.

* * * * *